(12) United States Patent
Kiss

(10) Patent No.: US 6,312,004 B1
(45) Date of Patent: Nov. 6, 2001

(54) APPARATUS FOR MAINTAINING CONNECTION BETWEEN A TOWING VEHICLE AND A TRAILER

(75) Inventor: Tibor Kiss, St. Joachim (CA)

(73) Assignee: Tow Hook Concepts L.L.C., Grosse Pointe Woods, MI (US)

( * ) Notice: Subject to any disclaimer, the term of this patent is extended or adjusted under 35 U.S.C. 154(b) by 0 days.

(21) Appl. No.: 09/552,840

(22) Filed: Apr. 20, 2000

Related U.S. Application Data

(63) Continuation-in-part of application No. 09/235,557, filed on Jan. 22, 1999, now Pat. No. 6,158,760.

(51) Int. Cl.$^7$ .................................................. B60D 1/28
(52) U.S. Cl. ........................ 280/507; 280/432; 280/504; 280/511; 280/512
(58) Field of Search ..................... 280/491.5, 491.1, 280/504, 514, 515, 507, 511, 512, 432

(56) References Cited

U.S. PATENT DOCUMENTS

| | | | |
|---|---|---|---|
| 1,479,182 | 1/1924 | Jeschke | 280/491.5 |
| 1,768,304 | 6/1930 | Ayler | 280/491.5 |
| 2,444,876 | 7/1948 | Kuhl | 280/33.44 |
| 2,687,899 | 8/1954 | Bendtsen | 280/504 |
| 2,712,452 | 7/1955 | Hallowell et al. | 280/79.1 |
| 3,311,390 | 3/1967 | Bendessy | 280/504 |
| 3,400,948 * | 9/1968 | Matson | 280/406 |
| 3,549,173 * | 12/1970 | Stanfield | 280/457 |
| 3,823,962 | 7/1974 | Martin, Jr. | 280/514 |
| 4,047,734 | 9/1977 | Miles | 280/486 |
| 4,082,311 * | 4/1978 | Hamman | 280/507 |
| 4,202,562 | 5/1980 | Sorenson | 280/415.1 |
| 4,374,593 | 2/1983 | Smith et al. | 480/491.5 |
| 4,398,744 | 8/1983 | Schoppel et al. | 280/504 |
| 4,428,596 * | 1/1984 | Bell et al. | 280/507 |
| 4,774,823 * | 10/1988 | Callison | 70/14 |
| 5,143,393 | 9/1992 | Meyer | 280/491.1 |
| 5,150,911 * | 9/1992 | Williams | 280/502 |
| 5,154,440 * | 10/1992 | Dolan et al. | 280/507 |
| 5,332,250 * | 7/1994 | Thorwall et al. | 280/507 |
| 5,344,174 * | 9/1994 | Sanders | 280/504 |
| 5,346,245 | 9/1994 | Budrow et al. | 280/655 |
| 5,378,008 * | 1/1995 | McCrossen | 280/507 |
| 5,476,279 | 12/1995 | Klemetsen | 280/415.1 |
| 5,476,281 * | 12/1995 | Worthington | 280/507 |
| 5,564,357 | 10/1996 | Peterson | 114/345 |
| 5,570,897 * | 11/1996 | Wass | 280/495 |
| 5,671,938 | 9/1997 | Olson | 280/515 |
| 5,725,805 | 3/1998 | LaRoque | 280/478.1 |
| 5,839,744 | 11/1998 | Marks | 280/416.4 |
| 5,897,126 * | 4/1999 | Morris | 280/491.5 |
| 6,155,587 * | 12/2000 | Milazzo | 280/457 |
| 6,158,760 * | 12/2000 | Kiss | 280/491.5 |
| 6,199,891 * | 3/2001 | Bell et al. | 280/507 |

* cited by examiner

Primary Examiner—Brian L. Johnson
Assistant Examiner—Deanna Draper
(74) Attorney, Agent, or Firm—Harness, Dickey & Pierce, P.L.C.

(57) ABSTRACT

A hitch assembly for use with a vehicle, where the hitch assembly incorporates a tow loop adapted to be easily coupled to a claw, hook or other like implement of a towing chain or alternatively to a towing strap or rope. The hitch assembly comprises a receiver and a hitch member. The hitch member includes a base portion which slides into the receiver such that only a tow loop of the hitch member is exposed. When not needed, the hitch member can be easily removed from the receiver and a different hitch implement attached to the receiver.

15 Claims, 4 Drawing Sheets

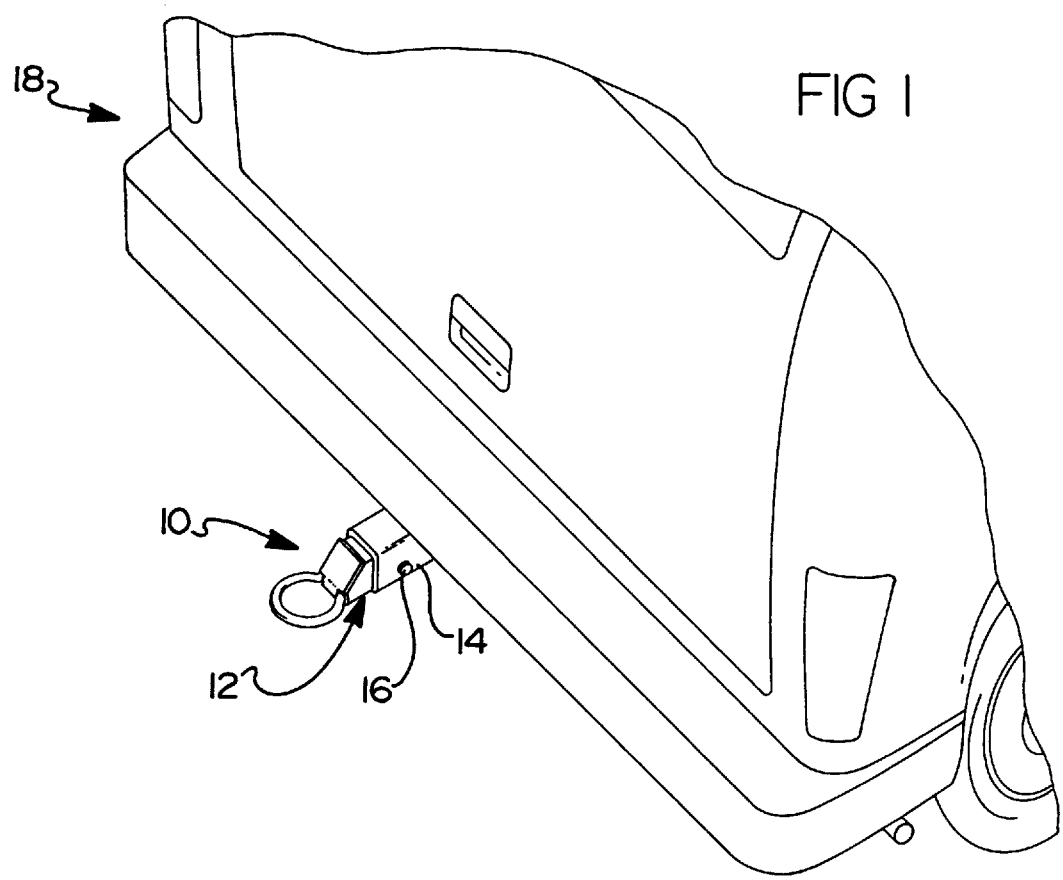
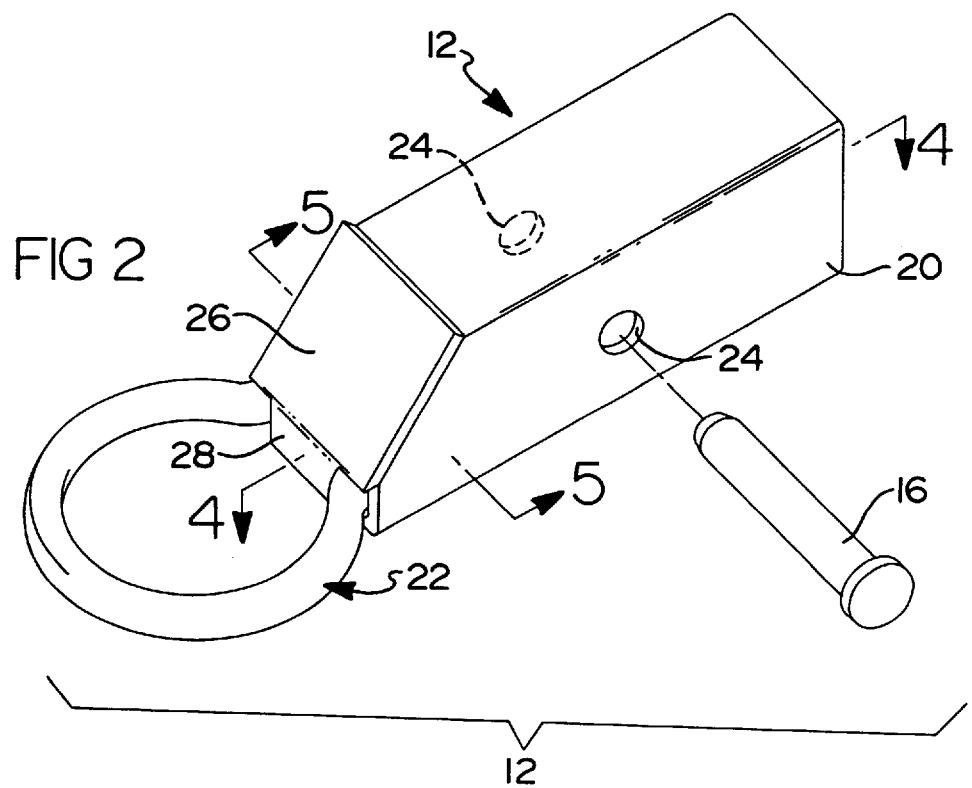

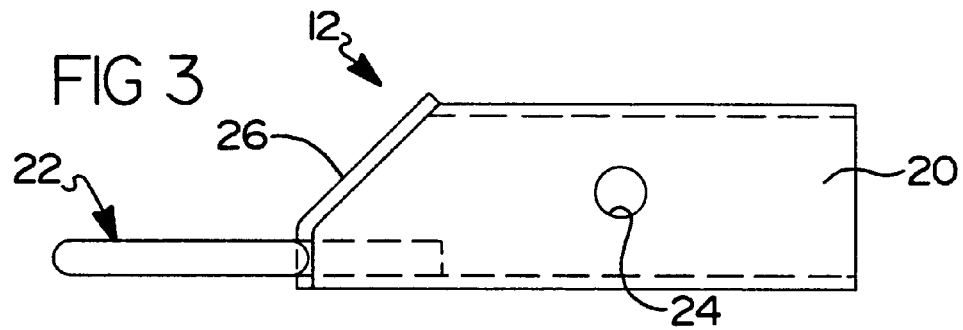
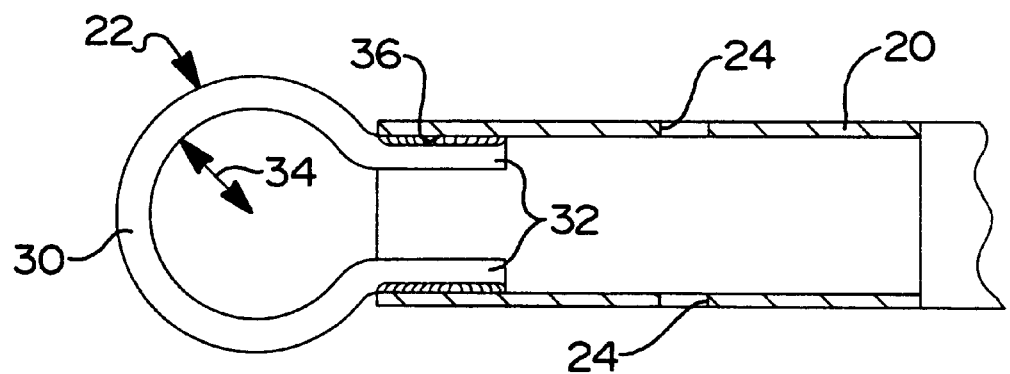
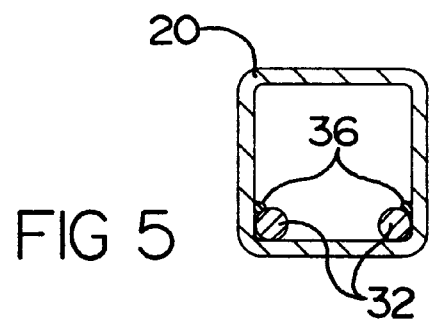

APPARATUS FOR MAINTAINING CONNECTION BETWEEN A TOWING VEHICLE AND A TRAILER

CROSS-REFERENCE TO RELATED APPLICATION

This is a continuation-in-part of U.S. Ser. No. 09/235,557, filed Jan. 22, 1999, now U.S. Pat. No. 6,158,760.

BACKGROUND OF THE INVENTION

1. Field of the Invention

The present invention generally relates to trailer hitch assemblies. More particularly, the present invention relates to a trailer hitch assembly incorporating a tow loop which enables the hitch assembly to easily be coupled to a hook of a towing chain, a rope or other form of towing strap. In addition, the present invention relates to an apparatus for maintaining connection between a towing vehicle and a trailer.

2. Discussion

Hitch assemblies are used in a wide variety of applications for towing trailers and other like vehicles. In one typical form, the hitch assembly includes a ball joint type hitch member which receives a mating hitch member of the item being towed. In other applications the hitch assembly includes a receiver, which essentially forms a tubular neck, into which the hitch member including such a ball joint style member is inserted. An external fastening element such as a steel pin is then inserted through openings in a portion of the hitch member as well as through aligned holes in the receiver such that the hitch member may be quickly attached and/or detached from the receiver simply by removal of one or more such pins.

The hitch implements presently available are not specifically suited for enabling towing by the use of a tow chain having a claw or hook shaped end. Furthermore, previously developed hitch members are not particularly well suited for enabling a towing strap, rope or other like item to be quickly and easily attached thereto.

In view of the foregoing limitations, it is a principal object of the present invention to provide a hitch assembly for a vehicle having a hitch member which includes a tow loop which is of dimensions to easily enable a towing chain having a hook or claw at an end thereof to be quickly and easily attached to the tow loop. It is a further object that the hitch member be constructed so as to enable it to be quickly and easily inserted into the receiver portion of the hitch assembly without modification to the receiver portion. In this matter, the hitch member can be easily removed from the receiver member and a different style of hitch member coupled to the receiver member if the tow loop is not needed.

SUMMARY OF THE INVENTION

According to a first aspect, the present invention relates to a hitch assembly which incorporates a hitch member having a tow loop portion. The hitch assembly comprises a tubular receiver which is adapted to slidably receive a base portion of the hitch member therein. Each of the tubular receiver and the base portion include openings which are formed so as to align with one another when the hitch member is fully inserted into the receiver portion. An external pin or other like fastening element can then be inserted through the aligned holes to quickly couple the hitch member to the receiver.

The tow loop of the hitch member is preferably formed from a single length of material, such as steel, in a somewhat U-shape. One end thereof forms a generally circular shape and the ends of the single length of material are positioned generally parallel to one another, and may be slid into the base portion during manufacture of the hitch member. The generally parallel end portions are welded within the base portion such that the hitch member forms an extremely strong, single piece component with the tow loop portion projecting outwardly of the base portion.

The hitch member of the present invention can therefore be quickly and easily inserted into or removed from the receiver without any special tools. The tow loop portion of the hitch member has a radius sufficiently large to enable a claw, hook or other like implement to be secured thereto. Alternatively, even a rope, nylon strap or other like implement can be inserted through the tow loop portion and used to tow another object.

According to a second aspect, the present invention relates to an apparatus for maintaining a connection between a towing vehicle and a trailer. In one form, the apparatus of the second aspect of the present invention includes a first portion coupled to the trailer and a second portion coupled to the hitch. The first and second portions are attached to one another for pivotal movement about a first axis.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a portion of a vehicle illustrating a trailer hitch assembly in accordance with the present invention secured to the vehicle.

FIG. 2 is a perspective view of the hitch member of the present invention together with a locking pin used to secure the hitch member to the receiver shown in FIG. 1.

FIG. 3 is a side view of the hitch member.

FIG. 4 is a cross sectional plan view of the hitch member in accordance with section line 4—4 in FIG. 2 illustrating the attachment of the tow loop portion to the base portion of the hitch member.

FIG. 5 is a cross sectional view in accordance with section line 5—5 in FIG. 2 of the ends of the tow loop portion secured within the base portion.

DETAILED DESCRIPTION OF THE PREFERRED EMBODIMENT

Figure 6:
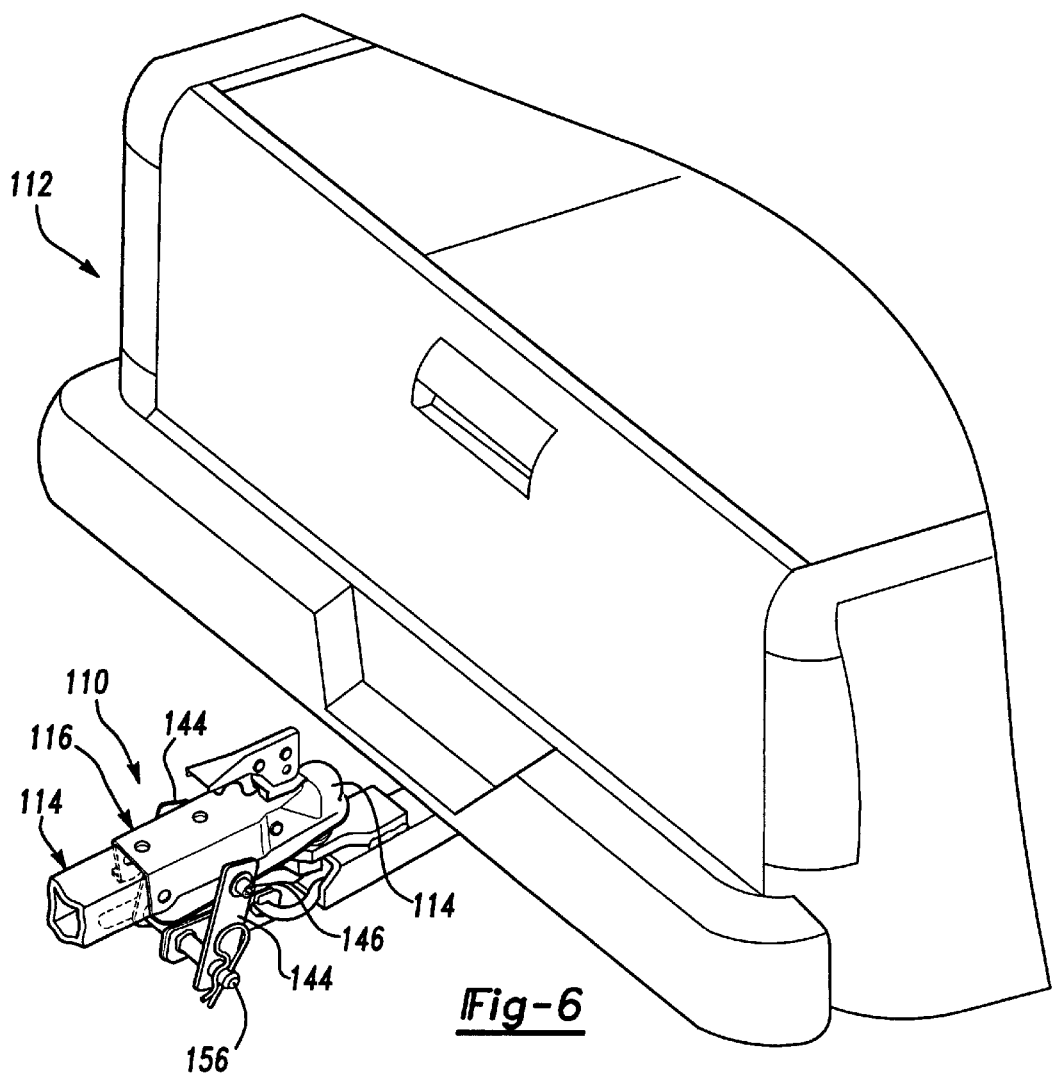
FIG. 6 is a perspective view of an apparatus for maintaining connection between a towing vehicle and a trailer constructed in accordance with the teachings of a second preferred embodiment of the present invention and shown operative associated with a portion of the motor vehicle and a portion of a trailer.

With general reference to FIGS. 1–5, a hitch assembly constructed in accordance with the teachings of a preferred embodiment of the present invention will be described. With particular reference to FIG. 1, there is shown a hitch assembly 10 in accordance with a preferred embodiment of the present invention. The hitch assembly comprises a hitch member 12 coupled to a receiver 14 via a locking pin or other like element 16. The receiver 14 is secured to a frame portion (not shown) of a vehicle 18 such as by welding.

In FIG. 2 the hitch member 12 is shown in greater detail. The hitch member comprises a base portion 20 and a tow loop portion 22. The base portion 20 includes a pair of aligned holes 24 which are of sufficient diameter to receive the locking pins 16 therethrough. The base portion 20 is preferably formed form a tubular length of steel and preferably includes an end member 26 welded thereto. The end member 26 has a lip portion 28 and substantially covers one end of the base portion 20. The end member 26 not only strengthens the entire hitch member 12 to resist torsional twisting forces that the hitch member 12 might experience, but also helps to prevent rust and corrosion by sealing off the end of the hitch member 12.

Referring to FIGS. 4 and 5, the tow loop portion 22 includes a loop 30 formed in a generally semi-circular shape and having a pair of parallel disposed, terminal end portions 32. The radius of the inner circle formed by the loop 30, and designated by dimensional arrow 34, may vary widely, but in the preferred embodiment is preferably about one inch. Thus, the opening formed by the loop 30 is of sufficient size to readily accept a hook or other daw-like implement or fastening member of a tow chain, or even a strap, rope or other like implement. It will be appreciated, however, that the tow loop 30 could be formed from a tube, or could comprise a stamped or cast component. Furthermore, it need not be in a semi-circular shape; the principal requirement is that it has an opening which enables a claw or like implement to be readily attached thereto.

The terminal end portions 32 of the tow loop 22 are welded, as indicated at points 36, to interior surfaces of the base portion 20 such that the tow loop 22 is fixedly secured to the base portion 20 and forms a very strong, single piece component. As can be seen in FIG. 5, the base portion 20 is preferably square in shape and is of dimensions which enable it to be easily slidably inserted within the tubular receiver 14 (FIG. 1). It is anticipated that in most applications the receiver will form a two inch by two inch, generally square shaped tubular member. It will be appreciated, however, that these dimensions could vary considerably, and that the important consideration is that the base portion 20 can be easily inserted with a minimal amount of play into the receiver 14.

The hitch member 12 thus forms an easy means of enabling a towing implement such as a chain having a hook or claw like member, or even a strap or rope, to be easily attached to the loop 30. When the hitch member 12 is not needed, it can be easily removed from the receiver 14 and a different style of hitch implement used with the receiver 14.

The single length of material forming the tow loop may vary in dimensions, but preferably consist of a single length of steel about 0.5 inch in diameter.

Turning now to FIGS. 6 through 9 of the drawings, a trailer hitch assembly 110 constructed in accordance with the teachings of a second preferred embodiment of the present invention will now be described. The trailer hitch assembly 110 is shown operatively incorporated between a motor vehicle 112 and a tongue 114 of a trailer. Prior to addressing the specific construction of the present invention, a brief understanding of the conventional cooperating elements shown in the drawings is warranted.

The tongue 114 of the trailer is illustrated to carry an end 116 which is bolted, welded or otherwise suitably attached to the trailer. The tongue end 116 conventionally includes a latching mechanism for releasably securing a ball 120 of a stem and ball assembly 122 within an aperture 134. This much of the hitch assembly 110 is conventional in construction.

The ball and stem assembly 122 is carried by a main body portion 124 which is insertable into a receptacle (not specifically shown) mounted to the motor vehicle 112. A closed loop member 126 is attached to the main body portion 124. The main body portion 124 and the closed loop 126 are substantially identical in construction to that disclosed above with respect to the first preferred embodiment of the present invention.

In the exemplary embodiment illustrated, the ball and stem assembly 122 is interconnected to the main body portion 124 through a mounting member 128. The mounting member 128 includes a first end 130 attached to the main body member 124 and a cantilevered second end 132. The first end 130 is welded or otherwise suitably secured to the main body portion 124. The cantilevered end 132 includes an aperture 134 for receiving the ball and stem assembly 122. A nut 136 secures the ball and stem assembly 122 to the mounting member 128. In the preferred embodiment, the ends 130 and 132 are parallel to one another but stepped from one another.

The trailer hitch assembly 110 is further shown to include a first portion 138 coupled to the trailer and a second portion 140 coupled to the hitch. As will become apparent below, the first and second portions 138 and 140 are attached to one another for relative pivotal movement about a first axis 142. In the preferred embodiment, the first portion 138 includes a pair of arms 144. The arms 144 are identical in construction and are each pivotally attached to the trailer at an end by a bolt 146. The bolt 146 defines a second axis.

Figure 7:
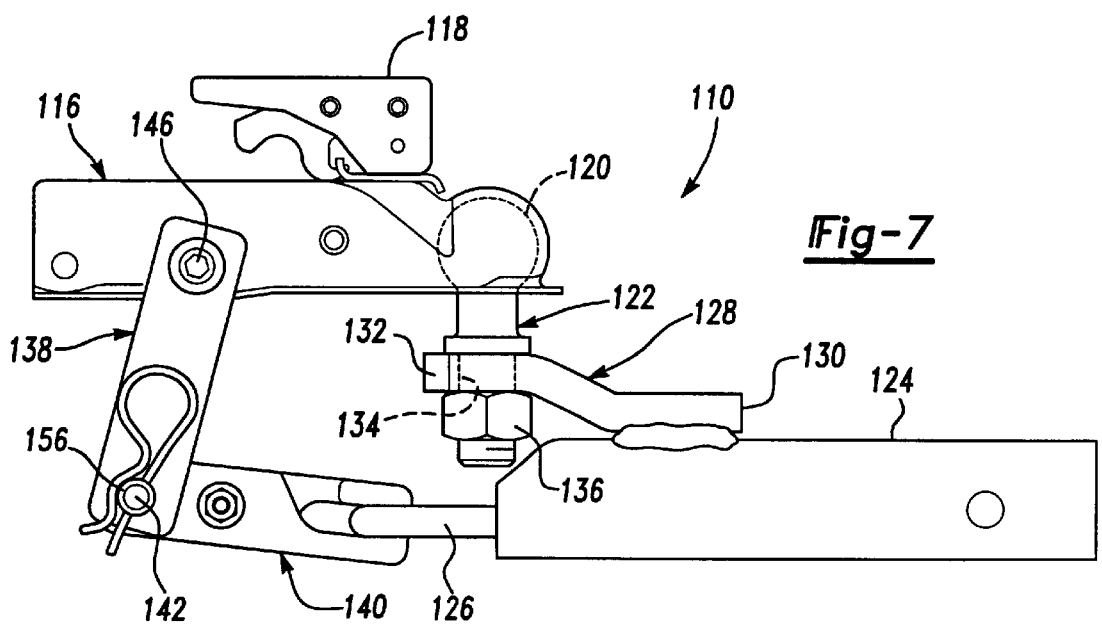
FIG. 7 is a side view of the apparatus of FIG. 6.
Figure 8:
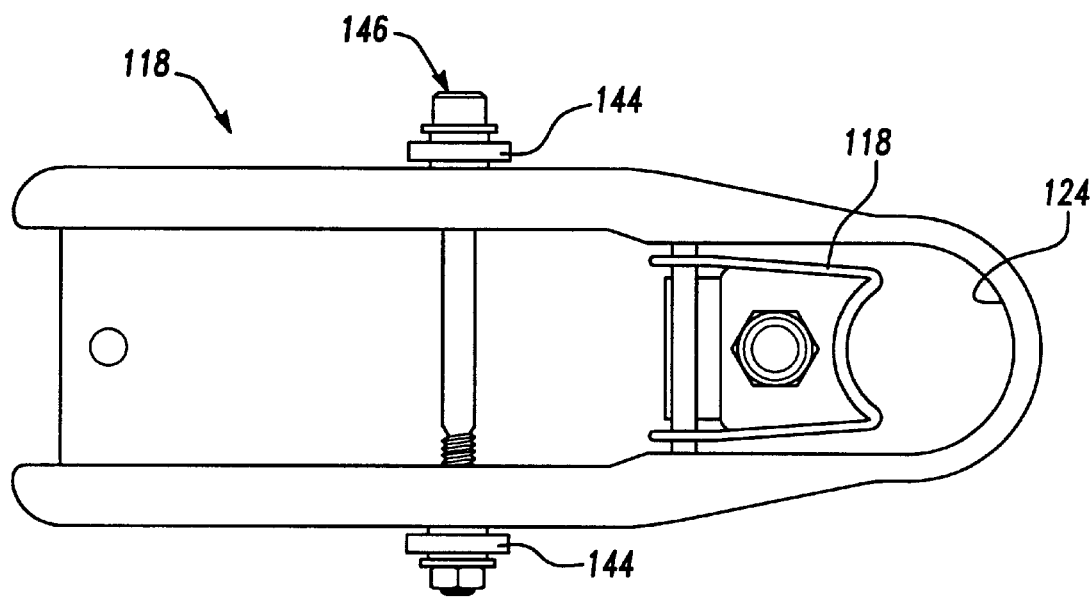
FIG. 8 is a bottom view of a portion of the apparatus of FIG. 6.
Figure 9:
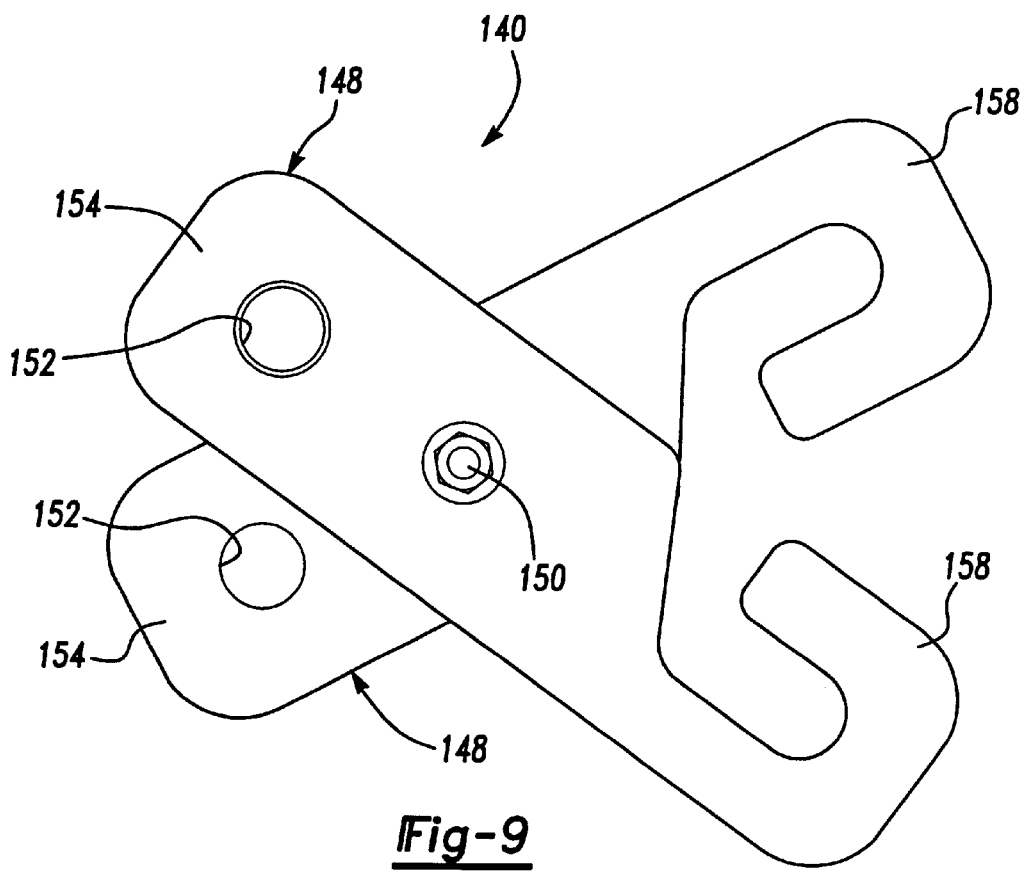
FIG. 9 is a side view of a portion of the apparatus of FIG. 6.

Further in the preferred embodiment, the second portion 140 includes a second pair of arms 148. The second pair of arms 148 are pivotally coupled to one another by a bolt 150 which defines a third axis. The arms of the second pair of arms 148 are movable relative to each other between a locked position (as shown in FIGS. 6 and 7) and an unlocked position (as shown in FIG. 9). When the arms 148 are in the locked position, an aperture 152 provided in an end 154 of each of the arms 148 aligns for receiving a pin 156. The pin 156 defines the first axis 142. The opposite ends 158 of the arms 148 are generally C-shaped and are configured to engage the closed loop 126 of the hitch.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An apparatus in combination with a trailer and hitch, the apparatus for maintaining connection between a towing vehicle carrying the hitch and the trailer, the hitch having a ball, the trailer releasably receiving the ball, the apparatus comprising:
   a first portion including a pair of arms coupled to the trailer, the pair of arms attached to the hitch for pivotal movement about a first axis; and
   a second portion coupled to the hitch;
   the first and second portions attached to one another for relative pivotal movement about a second axis substantially parallel to the first axis.

2. The apparatus for maintaining connection between a towing vehicle and a trailer of claim 1, wherein the towing hitch further includes a loop member, the second portion releasably attached to the loop member.

3. The apparatus for maintaining connection between a towing vehicle and a trailer of claim 1, wherein the second portion includes a second pair of arms, the second pair of arms being pivotally coupled to one another for relative movement about a third axis.

4. An apparatus in combination with a trailer and hitch, the apparatus for maintaining connection between a towing vehicle carrying the hitch and the trailer, the hitch having a ball, the trailer releasably receiving the ball, the apparatus comprising:
   a first pivot shaft connected to the trailer and extending substantially perpendicular to a tongue of the trailer;
   a first portion having a first pair of arms disposed on opposite sides of the tongue, both of the arms having a first end pivotal about the first pivot shaft;
   a second portion attached to the towing hitch; and
   a second pivot shaft interconnecting a second end of both of the first pair of arms and the second portion.

5. The apparatus for maintaining connection between a towing vehicle and a trailer of claim 4, wherein the second pivot shaft is substantially parallel to the first pivot shaft.

6. The apparatus for maintaining connection between a towing vehicle and a trailer of claim 4, wherein the towing hitch further includes loop member, the second portion releasably attached to the loop member.

7. The apparatus for maintaining connection between a towing vehicle and a trailer of claim 4, wherein the second portion includes a second pair of arms, the second pair of arms being pivotally coupled to one another for relative movement about an axis.

8. An apparatus in combination with a trailer and a hitch assembly, the apparatus for maintaining connection between a towing vehicle carrying the hitch assembly and the trailer, the hitch assembly having a main body portion, a ball and stem member releasably interconnected to the main body portion, the ball engaged by the trailer such that universal movement is permitted therebetween, and a closed loop member attached to the main body portion, the apparatus comprising:
   a first portion pivotally coupled to the trailer;
   a second portion pivotally coupled to the first portion and releasably engaging the closed loop.

9. The hitch assembly for a motor vehicle of claim 8, further comprising a mounting member fixedly attached to an upper surface of the main body portion, the mounting member defining an aperture for receiving the ball and stem member.

10. The hitch assembly for a motor vehicle of claim 8, wherein the closed loop member is disposed below the ball and stem member.

11. The hitch assembly for a motor vehicle of claim 8, wherein the closed loop member is oriented in a plane perpendicular to an axis defined by the ball and stem member.

12. The hitch assembly for a motor vehicle of claim 8, wherein the main body portion is hollow.

13. The apparatus of claim 8, wherein the apparatus maintains the universal movement between the trailer and the ball.

14. The apparatus of claim 8, wherein the second portion includes a pair of arms attached to one another for pivotal movement about an axis perpendicular to a longitudinal axis of the tongue.

15. The apparatus of claim 14, wherein an end of each of the arms is generally C-shaped.

* * * * *